United States Patent [19]

Curtice et al.

[11] 3,955,993

[45] May 11, 1976

[54] METHOD AND COMPOSITION FOR STABILIZING INCOMPETENT OIL-CONTAINING FORMATIONS

[75] Inventors: Beverly A. Curtice, Portsmouth, Va.; Bobby G. Harnsberger, Houston, Tex.

[73] Assignee: Texaco Inc., New York, N.Y.

[22] Filed: Sept. 26, 1974

[21] Appl. No.: 509,386

Related U.S. Application Data

[62] Division of Ser. No. 429,428, Dec. 28, 1973, Pat. No. 3,862,663.

[52] U.S. Cl................................... 106/90; 106/98
[51] Int. Cl.².......................................... C04B 7/35
[58] Field of Search................................ 106/90, 98

[56] References Cited
UNITED STATES PATENTS

| | | | |
|---|---|---|---|
| 3,429,373 | 2/1969 | Harnsberger et al. | 106/90 |
| 3,646,998 | 3/1972 | Curtice et al. | 106/90 |

*Primary Examiner*—J. Poer
*Attorney, Agent, or Firm*—T. H. Whaley; C. G. Ries; James F. Young

[57] ABSTRACT

Improved method of and composition for the treatment of an oil-containing incompetent formation to prevent the movement of unconsolidated sand particles in an underground formation by forming a treating composition of sand, cement, silica flour and a sufficient amount of petroleum oil fraction containing an oil-wetting agent therein to oil-wet the sand, cement and silica flour particles suspending the resulting treating composition in an aqueous carrier medium, injecting the aqueous suspension against the unconsolidated formation at a pressure effective to force the treating composition into contact with the unconsolidated formation, contacting the placed treating composition with an aqueous curing solution to water wet the cement particles, permitting the cement to set and form a permeable cement and recovering oil through the cement.

6 Claims, No Drawings

METHOD AND COMPOSITION FOR STABILIZING INCOMPETENT OIL-CONTAINING FORMATIONS

This is a division, of application Ser. No. 429,428 filed Dec. 28, 1973, now U.S. Pat. No. 3,862,663.

The present invention relates to the treatment of permeable underground formations. More particularly, the present invention relates to an improved method of treating permeable underground unconsolidated sand-containing formations and particularly oil and/or gas containing unconsolidated sand formations to stabilize the sandy portion thereof and to an improved treating composition useful in the stabilization of such incompetent sand-containing underground formations.

The recovery of fluids such as, for example, gas and/or oil from underground formations has been troublesome in areas wherein the underground formation is composed of one or more incompetent sand-containing layers or zones. The sand particles in the incompetent zone and/or layer tend to move or migrate to the wellbore during recovery of the formation fluids from the particular zone and/or layer and frequently the moving sand particles block the passageways leading to the wellbore. Plugging or materially impairing the flow of the formation fluids toward the bore hole results in a loss of these fluids to the producer or so decreases the rate of fluid recovery from the well as to cause the well to be shut down because it is economically unattractive to continue to produce therefrom. An additional adverse factor resulting from the movement of the sand particles toward the wellbore is that they are often carried along with the formation fluids to the wellbore and passed through the pipes, pumps, etc., being used to recover the formation fluids to the surface with resulting damage to the moving parts thereof as the sand particles are very abrasive.

Many attempts have been made heretofore to prevent or decrease the flow of undesirable sand particles in the formation and/or in the production tubing and associated equipment, such as by the placement of sand screens, filters, liners and so forth. These prior attempts have been unsuccessful for a number of reasons, among which is that these mechanical devices fail to prevent completely the flow of the formation particles into the production equipment. In addition, these devices interfere with various types of completion and workover operations. In recent years the industry has attempted to avoid the difficulties encountered in the use of mechanical devices by employing various chemical compositions to effect consolidation of the underground imcompetent formations. These methods have generally consisted of injecting into the underground formation polymerizable resinous materials which, when subsequently polymerized, form permeable barriers in the formation to prevent the sand particles from movement therethrough. However, this technique of sand consolidation has not met with widespread acceptance because of the inherent difficulties of effecting polymerization of the resinous materials in the formation to a degree sufficient to consolidate these underground formations and yet permitting the unobstructed flow of the desirable formation fluids therethrough. Further, the cost associated with these resin coating methods has been relatively high in comparison with the prior mechanical methods.

It is known from commonly assigned U.S. Pat. No. 3,429,373, issued Feb. 25, 1969, and U.S. Pat. No. 27,271 dated Jan. 11, 1972, entitled "Method and Composition for Stabilizing Incompetent Oil-Containing Formations," to form a slurry of sand, cement and a sufficient amount of a petroleum oil fraction containing an oil wetting agent therein to oil wet the sand and cement particles, suspending the oil wet sand and cement particles in an aqueous carrier medium, injecting the aqueous suspension against the unconsolidated sand formation, contacting the suspension with an aqueous surface active agent solution to water wet the cement particles, permitting the cement to set and form a permeable cement and recovering oil through the cement.

It is also known from commonly assigned U.S. Pat. No. 3,646,998, issued Mar. 7, 1972, to incorporate from 0.02 to 0.04 part of finely ground silica per part by weight of cement into the sand, cement, oil admixture to improve the compressive strength of the set permeable cement.

It has now been found that the method and compositions disclosed and claimed in the aforesaid patents can be further improved by the practice of the present invention.

By the improved method and composition of the present invention one is able to treat more effectively the underground formation to be stabilized in a rapid and efficient manner.

One object of the present invention is to provide an improved method of treating underground sand-containing formations to stabilize the incompetent formation. An additional object is to provide an improved fluid permeable barrier between the formation sand and the wellbore to prevent or to minimize the flow of unconsolidated sand particles therethrough while maximizing the flow of desired fluids and particularly petroleum hydrocarbons therethrough. A still further object is to provide an improved novel treating composition for use in stabilizing incompetent sand formations.

How these and other objects of the invention are accomplished will become apparent with reference to the accompanying disclosure. In at least one embodiment of the method of this invention at least one of the foregoing objects will be obtained.

In the practice of the methods and compositions for stabilizing incompetent oil-containing formations as described in the aforesaid patents, several difficulties arose with the treating composition and its application to an oil producing formation. Specifically, the particles of cement in the known treating composition mixtures occasionally separated from the sand particles thereof when the composition was being pumped into a wellbore as an aqueous suspension.

It has now been discovered that an improved method and composition for the treatment of an incompetent sand containing underground formation comprises introducing against said formation a specific treating composition consisting essentially of a particular sized sand that has been oil wet with a particular hydrocarbon oil, cement and oil wetting agent and finely ground silica, suspended in the aqueous carrier medium in an amount sufficient to stabilize the formation and then to contact the introduced treating composition with an aqueous curing solution as hereinafter described to penetrate the oil layer about the sand, cement and finely ground silica components of the treating composition and to effect setting of the cement to form a fluid permeable barrier between the formation and the wellbore. The resultant formed permeable cement barrier serves to prevent or to materially reduce the flow of the unconsolidated sandy particles therethrough while permitting the flow of desirable formation fluids through the permeable barrier at a substantially unimpaired rate.

In carrying out the improved method and composition of the present invention the treating composition suspended in the aqueous carrier medium can be pumped down the wellbore preferably under sufficient pressure to force the hydrocarbon oil wetted sand-cement-oil wetting agent-finely ground silica admixture against the unconsolidated formation adjacent to or in reasonable proximity to the wellbore. When the treating composition is placed against the formation to be consolidated the treating composition then is contacted with an aqueous curing solution which displaces the oil layer around the sandcement finely ground silica particles and renders these particles water wet. The cement component of the composition then sets up and hardens. After the cement hardens the well can be equipped for production, and the formation fluids can be recovered by passing through the resulting formed permeable cement barrier into the wellbore and recovered therefrom without the formation fluids being contaminated with the presence therein of unconsolidated sand particles.

The improved method and composition of the present invention is particularly adaptable for use in any type of well completion but is generally used in a well wherein casing has been set and which has perforations therein at the desired intervals behind which the unconsolidated formation sands are located. Packers can be initially set above and below the perforated intervals to prevent the treating composition from passing into the non-isolated portions of the well and also to permit build-up of sufficient pressures on the treating composition to force same through the perforations and against the formation without plugging up the wellbore. After the treating composition has been forced through the casing perforations and against the formation, and after it has been contacted with the aqueous curing solution, the well is closed in to permit the cement to set and form the permeable cement barrier for the unconsolidated sand in the formation.

The new and improved treating composition useful in the method of the present invention must meet certain specific requirements. The sand component in general should be closely sized in the range of 20–40 mesh, to permit effective relatively high permeability cement barriers being formed. In addition, the ratio of the sand component to the cement component should be about 4 parts to about 6 parts by weight of sand, preferably from about 4.5 to about 5.5 parts, per part of cement. It has been found that a frac sand, i.e., a sand customarily used in formation fracturing operations, having a size of between about 20 and 40 mesh, is most suitable for use in the cement slurry of the present invention. In general, a 20–40 mesh sand is used because of its ready availability and adaptability for use in stablizing most formations. In addition, the use of a 20–40 mesh sand appears to prevent premature bridging which is likely to be more prevalent with finer mesh sands. Sand particles which are coarser than about 12 mesh and finer than about 80 mesh are unsuitable for use in the composition of the present invention. The coarser particles are not satisfactory because the resultant set cement barrier has too great a permeability to prevent the flow of very fine unconsolidated sand particles therethrough when the well is placed on production. Very fine sand particles, that is those sand particles finer than about 80 mesh, are unsuitable because the resultant set cement has too low a permeability to permit the flow of desired formation fluids therethrough.

The cement component of the composition of the present invention should be present in the composition in a ratio of about 1 part of cement to from 4 to about 6 parts by weight of sand, on a weight basis. The cement component of the composition of the present invention may be any of the cements normally used in oil well cementing operations as well as plaster of paris cement. It is preferred that the cement component be a light weight portland cement having a density of about 75 pounds per cubic foot and a chemical analysis approximately as follows: silicon dioxide 38.3%, aluminum oxide 13.0%, ferric oxide 5.2%, calcium oxide 35.7%, magnesium oxide 1.6% and sulfur trioxide 2.4%, with a loss on ignition of approximately 3.3%. This particular light weight portland cement has been found to be most suitable in the composition of the present invention since permeable cements made from this cement are most stable to attack by formation brines containing sodium chloride or sodium sulfate. Other oil well cements are not as resistant to attack by formation brines or sulfate solutions and therefore, are not as practical for use in the cement composition of the present invention. These other cements appear to lose some of their compressive strength and become eroded from contact with sodium chloride and sodium sulfate solutions. In contrast, the cements of the composition of the present invention are very resistant to erosion by sodium chloride or sodium sulfate solutions and do not lose their compressive strengths even after prolonged exposure thereto.

The finely ground silica component of the composition must be of a size sufficient to pass through the openings of a No. 200–325 sieve (U.S. Sieve Series) i.e., (a sieve having openings of 0.0029–0.0017 inch). The finely ground silica component is employed in an amount of from about 0.01 part to about 0.04 part, preferably 0.03 to 0.035 part, by weight per part by weight of cement.

The hydrocarbon oil component of the composition should be employed in an amount of from about 0.3 part to about 0.4 part by weight per part by weight of cement. It is preferred that the oil component be employed in an amount of about 0.35 to about 0.4 part by weight per part by weight of cement. Use of the oil component in this amount provides sufficient oil to wet the cement and sand components of the composition and at the same time avoids an excess thereof which might damage the unconsolidated underground formation by the cement component being dispersed from the sand component when the composition is placed adjacent thereto.

The use of amounts of hydrocarbon oil component of the treating composition above about 0.4 part by weight, per part of cement, results in poor compressive strengths to the set cement, since the oil component is not readily removed from the sand grains by the curing solution. Moreover, amounts less than 0.3 part thereof are unsatisfactory, for some of the cement particles become dispersed in the water carrier and a set cement barrier is not obtainable.

The hydrocarbon oil component of the novel treating composition is a blended, refined lubricating oil containing from about 1 to 7% by weight of lead naphthenate, and preferably also from about 1 to 7% by weight of sulfurized sperm oil. Most effective results have been obtained using a blended, refined lubricating oil containing about 3 to 6% by weight of lead naphthenate and about 6% by weight of sulfurized sperm oil. Optionally, the sulfurized sperm oil can be replaced in whole or in part by a synthetic sulfurized oil, such as a composition sold under the trade name "Elco 235". Typical properties of this material are: an API gravity of 17.7, a Flash Point of 425°, a Fire Point of 475° F., a Viscosity at 210° F. of 140, a total sulfur content of 10.5–11.5, a Free Sulfur content of 0.01, and a Saponification No. of 115, minimum. This material is customarily employed as an extreme pressure agent in lubricating oil compositions.

The hydrocarbon oil has the following typical properties: an API Gravity of from about 17° to 24°, a Flash Point (COC) of 415° to 520° F. minimum, a Viscosity SUS of 99 to 285, a Viscosity Index of about 80 minimum.

It is prepared from (a) a paraffin base residual cut that has been fractionated, deasphalted, furfural refined and solvent dewaxed, and (b) a naphthenic base residual cut that has been fractionated, deasphalted, furfural refined and solvent dewaxed.

A necessary component of the petroleum oil fraction of the composition of the present invention is an oil wetting agent, a water insoluble oleophilic material of relatively high molecular weight which will permit the petroleum fraction to oil wet the surfaces of the sand, cement and finely ground silica particles in the treating composition. The oil wetting agent must contain an oleophilic group and a polar group for preferential adsorption on or at the oil and sand-cement interfaces. Representative oil wetting agents useful in the practice of the present invention include the relatively high molecular weight amines, such as, for example, the $C_{10}$–$C_{18}$ hydrocarbylamines, decyl-, dodecyl- and octadecylamine, the $C_{10}$–$C_{18}$ fatty alcohols such as cetyl and octadecyl alcohols, the $C_{10}$–$C_{18}$ alkylated phenols and naphthols, natural fatty materials such as lanolin, lard, cottonseed oil and fatty acid glycerides, amides such as $C_{12}$–$C_{18}$ fatty acid amides, and mixtures of these oil wetting agents. A preferred oil wetting agent is a salt of a polyethoxylated diamine based on tallow amine, a cationic agent sold under the trade name "Redicote 80-S", by Armak Chemicals Division.

The oil-wetting agent is used in an amount of from about 0.009 to about 0.02 part by weight, based on the weight of the cement particles in the treating composition.

The order of mixing the components of the treating composition is important. The sand, cement, oil and oil wetting agent components are first intimately mixed then the finely ground silica is added to the first admixture and further mixed. Failure to observe this procedure will result in a decrease of the average compressive strength of the formed permeable cement. It is preferred to mix the sand and cement components separately, the oil and oil wetting agent separately, then mix the two mixtures and finally to add the finely ground silica thereto and intimately admix the entire treating composition.

The carrier fluid for the treating composition must be compatible with any clay present in the formation being treated, as well as the components of the treating composition.

Suitable carrier media include fresh water, fresh water containing a salt such as 10% sodium chloride, 3% potassium chloride, 2% calcium chloride on a weight basis. Most produced brines have generally been found to be unsatisfactory because these fluids cause objectionable dispersion of the cement component in the carrier fluid. A particularly preferred carrier fluid is fresh water or fresh water containing about 10% sodium chloride.

The carrier fluid containing the suspended oil wet sand and cement solids is pumped down the wellbore and into the formation at a rate of from about 1 to 4 barrels in the carrier medium per minute, with 1 to 4 lbs. of suspended solids per gallon. Such pumping rates have been found to give the most satisfactory results in the practice of the invention.

After placement of the oil-wetted sand-cement treating composition in the formation to be consolidated, the composition is contacted with a specific curing solution to initiate hardening of the cement.

The curing solution is composed of an admixture on a weight basis of from about 5 to 40% caustic, 0.1 to 0.3% of a very high molecular weight water soluble polymer material, a "cellulose derivative" hereinafter defined as a thickening agent, from about 5 to 35% of a water soluble solvent such as a lower alkanol, 0.5 to 2% of a water soluble surface active agent, the balance water that may contain from 0.001 to 0.002% of a strong oxidizing agent as a gel breaking component such as ammonium persulfate.

The very high molecular weight water soluble, polymer material is a non-ionic cellulose drivative having a viscosity measured at a concentration of 1% in water at 25° C. of from about 3500 to 5000 centipoises, Brookfield. As used in the specification and claims, this expression, "cellulose derivative" refers to the above-described polymer material.

Optionally, potash can be used in place of caustic or a mixture thereof. Other gel breaking components that are strong oxidizing agents such as peroxides or hypochlorites can be used in place of ammonium persulfate or in admixture therewith.

Suitable alkanols include methanol, ethanol, isoproponal or mixtures of such alkanols.

The water soluble surface active agent used in the curing solution is designed to penetrate the oil-sand-cement interface and water wet the cement particles and remove the oil therefrom. Representative surface active agents that will perform satisfactorily during solution of the present invention include anionic, cationic and nonionic materials such as the alkyl, aryl and alkaryl sulfates and sulfonates, the sulfonated alkoxylated amides, esters or ethers, hydrocarbylamine salts, esters or etheresters of natural fats and oils or alkyl phenols. The surface active agents include polyoxyethylene sorbitan-monolaurate, -monopalmitate and -monooleate, oxyalkylated amyl phenol, alkaryl polyether alcohols and polyoxyethylene ether. A preferred surface active agent is an ethoxylated nonylphenol containing about 9.5 moles of ethylene oxide, known by the trade name "Surfonic N-95".

The mixing procedure to be followed in preparing the solution of the curing composition is as follows:

The cellulose derivative is mixed slowly with the water component with vigorous agitation until a fairly uniform gel solution is obtained (about 20–30 minutes). The caustic or potash component is added to the resulting gel with stirring, followed by addition of the lower alkanol and surfactant components. If employed, the gel breaker is added last. Preferably, the latter three components are added just prior to the use of the curing solution.

In the improved method of the present invention it is necessary to maintain the curing solution in contact with the emplaced oil-wetted sand-cement treating composition during the time required for the cement component to set up and harden. Suitable times include from about 72 hours at a bottom hole temperature of about 100° F. to about 24 hours at a temperature of about 180° F. Most effective curing times are from about 48 to 72 hours for attainment of excellent compressive strengths in the order of 900–1000 psi.

It has been found that removal of the curing solution from the placed treating composition prior to substantially complete curing thereof results in a material decrease in the compressive strength of the set cement.

Removing the curing solution from the placed treating composition after 8 hours contact time, yielded a compressive strength of 510 psi; after 16 hours, 685 psi, whereas maintaining the contact time for 48 hours resulted in a compressive strength of 890 psi.

EXAMPLE

A mixture of 100 lbs. of a frac sand having a particle size of 20–40 mesh and 18.75 pounds of a hydraulic cement known by the trade name "Trinity Lite Wate Cement", was prepared by intimately mixing the sand and cement. There was added to the mixture with stirring 7.025 pounds of a blended lubricating oil fraction containing 6% by weight of sulfurized sperm oil and 6% by weight of lead naphthenate containing 0.1715 pounds of the cationic antistripping agent "Redicote 80-S". The resulting stirred mixture of oil wet solids was then mixed with 0.6 pounds of finely ground silica flour of a size capable of passing through the openings of a No. 325 sieve (openings 0.0017 inch). The treating composition admixture then was suspended in an amount of about 1 pound thereof per gallon of a carrier fluid composed of a synthetic brine (10% NaCl in fresh water). The suspension of oil wet solids in the aqueous carrier was pumped at a rate of 2 barrels/minute through production tubing and then reversed out. In all, the treating composition travelled through about 8000 feet of tubing. No evidence of any adverse dispersion effects were found. A repeat run was made using a produced brine with equally effective results.

In the laboratory tests separate portions of the aforesaid treating composition in both of the carrier liquids were pumped into test cells measuring 3 inches in diameter by 6 inches in length. The cells had been previously about half filled with packed sand particles having a mesh size of 70–300. The oil wet sand-cement finely ground silica treating composition was filtered out of the saline carrier liquid. Thereafter, each cell was treated with a curing solution consisting of fresh water containing 10% by weight sodium hydroxide, 6.6% by weight of isopropanol, 0.1% by weight of the cellulose derivative and 0.9% by weight of the surfactant Surfonic N-95, an ethoxylated nonylphenol having an average of 9.5 ethylene oxide groups therein.

The cells were cured for 24 hours at 180° F. The cured cement placed by the synthetic brine carrier fluid exhibited a compressive strength of 990 psi and had a water permeability of 20.8 darcys. The cured cement placed by the produced brine carrier fluid had a compressive strength of 890 psi and a permeability of 18.8 darcys.

A salt water solution containing 10% by weight of salt was flowed through the permeable cement at a rate of 200 ml. per minute for a period of 12 weeks. Measurements of the permeable cement after this period indicated its compressive strength to be about 790 psi, showing no substantial impairment.

Obviously, many modifications and variations of the invention as hereinbefore set forth may be made without departing from the spirit and scope thereof, and therefore only such limitations should be imposed as are indicated in the appended claims.

We claim:

1. A treating composition suspended in an aqueous medium fraction for use in forming a permeable cement barrier against an unconsolidated sand-containing oil producing formation which comprises cement, from about 4 to 6 parts by weight of sand particles having a mesh size of from about 20 to 40 mesh, from 0.3 to 0.4 part of a blended refined lubricating oil fraction containing from about 1 to 7% by weight of sulfurized sperm oil and from about 1 to 7% by weight of lead naphthenate therein, from about 0.009 to about 0.02 part by weight of an oil wetting agent to oil wet the sand and cement particles, and from about 0.01 to about 0.04 part by weight of finely ground silica per part of cement, said treating composition being present in said aqueous carrier medium in an amount of from about 1 to 5 pounds by weight per gallon of the carrier medium.

2. A composition as claimed in claim 1, wherein said oil wetting agent is a member selected from the group consisting of $C_{10}$–$C_{18}$ aliphatic-amine, -alcohol, -acid, -amide, -glyceride, a $C_{10}$–$C_{18}$ alkyl phenol, a $C_{10}$–$C_{18}$ alkyl naphthol and mixtures of these materials.

3. A composition as claimed in claim 1, wherein said oil wetting agent is a salt of a polyethoxylated diamine based on tallow amine.

4. A composition as claimed in claim 1, wherein the lubricating oil fraction is a blend of a refined paraffin base lubricating oil and a refined naphthenic base lubricating oil.

5. A composition as claimed in claim 1, wherein said finely ground silica component is added to the composition after the cement, sand, oil wetting agent and lubricating oil fraction components are mixed together to form an initial admixture.

6. A treating composition suspended in an aqueous medium fraction for use in forming a permeable cement barrier against an unconsolidated sand-containing oil producing formation which comprises cement, from about 4.5 to 5.5 parts by weight of sand particles having an average mesh size of from about 20 mesh to about 40 mesh, from 0.009 to about 0.02 part by weight of an oil wetting agent, from 0.35 to 0.4 part by weight of a blended refined lubricating oil fraction containing from about 4 to 6% by weight thereof of sulfurized sperm oil and from about 4 to 6% by weight thereof of lead naphthenate and from 0.03 to 0.035 part by weight of finely ground silica having a size sufficient to pass through a sieve having a sieve opening of 0.0029 to 0.0017 inch, each per part by weight of cement, said treating composition being suspended in an aqueous carrier medium in an amount of from about 1 to 5 pounds per gallon of the aqueous medium.

* * * * *